US008823804B2

(12) United States Patent
Haering et al.

(10) Patent No.: US 8,823,804 B2
(45) Date of Patent: Sep. 2, 2014

(54) METHOD FOR FINDING PATHS IN VIDEO

(75) Inventors: Niels Haering, Reston, VA (US); Zeeshan Rasheed, Sterling, VA (US); Li Yu, Herndon, VA (US); Andrew J. Chosak, Arlington, VA (US)

(73) Assignee: ObjectVideo, Inc., Reston, VA (US)

( * ) Notice: Subject to any disclaimer, the term of this patent is extended or adjusted under 35 U.S.C. 154(b) by 0 days.

(21) Appl. No.: 13/354,141

(22) Filed: Jan. 19, 2012
(Under 37 CFR 1.47)

(65) Prior Publication Data
US 2012/0268594 A1 Oct. 25, 2012

Related U.S. Application Data

(63) Continuation of application No. 11/739,208, filed on Apr. 24, 2007, now abandoned, which is a continuation-in-part of application No. 10/948,751, filed on Sep. 24, 2004, now abandoned.

(51) Int. Cl.
*H04N 7/18* (2006.01)
(52) U.S. Cl.
CPC .............. *H04N 7/181* (2013.01); *H04N 7/183* (2013.01)
USPC ........... 348/169; 348/143; 348/152; 348/155; 348/156; 348/161
(58) Field of Classification Search
CPC ....... H04N 7/181; H04N 5/225; H04N 7/183; H04N 7/18
USPC .......................................... 348/143, 152, 169
See application file for complete search history.

(56) References Cited

U.S. PATENT DOCUMENTS

| | | | |
|---|---|---|---|
| 5,379,236 A | 1/1995 | Yamamoto et al. | |
| 5,969,755 A * | 10/1999 | Courtney | 348/143 |
| 6,392,704 B1 * | 5/2002 | Garcia-Ortiz | 348/373 |
| 6,542,621 B1 | 4/2003 | Brill et al. | |
| 6,628,835 B1 | 9/2003 | Brill et al. | |
| 6,643,387 B1 * | 11/2003 | Sethuraman et al. | 382/107 |
| 6,678,413 B1 * | 1/2004 | Liang et al. | 382/181 |
| 6,816,184 B1 | 11/2004 | Brill et al. | |
| 6,985,172 B1 | 1/2006 | Rigney et al. | |
| 2004/0130620 A1 | 7/2004 | Buehler et al. | |

(Continued)

OTHER PUBLICATIONS

Stauffer, C., "Minimally-Supervised Classification Using Multiple Observation Sets," Proc. Intl. Conf. on Computer Vision, 2003.

(Continued)

*Primary Examiner* — Jude Jean Gilles
*Assistant Examiner* — Jaren M Means
(74) *Attorney, Agent, or Firm* — Muir Patent Consulting, PLLC

(57) ABSTRACT

A system for detecting behavior of a target may include: a target detection engine, adapted to detect at least one target from one or more objects from a video surveillance system recording a scene; a path builder, adapted to create at least one mature path model from analysis of the behavior of a plurality of targets in the scene, wherein the at least one mature path model includes a model of expected target behavior with respect to the at least one path model; and a target behavior analyzer, adapted to analyze and identify target behavior with respect to the at least one mature path model. The system may further include an alert generator, adapted to generate an alert based on the identified behavior.

23 Claims, 8 Drawing Sheets

(56) References Cited

U.S. PATENT DOCUMENTS

2005/0163346 A1 7/2005 van den Bergen et al.
2006/0072010 A1 4/2006 Haering et al.
2006/0222209 A1 10/2006 Zhang et al.
2006/0279630 A1 12/2006 Aggarwal et al.

OTHER PUBLICATIONS

Makris, D. and T. Ellis, "Path Detection in Video Surveillance," Image and Vision Computing Journal, vol. 20/12, Oct. 2002, pp. 895-903.

* cited by examiner

METHOD FOR FINDING PATHS IN VIDEO

CROSS REFERENCE TO RELATED APPLICATIONS

This application is a continuation of U.S. application Ser. No. 11/739,208, entitled "METHOD FOR FINDING PATHS IN VIDEO," filed Apr. 24, 2007, which is a continuation in part of U.S. application Ser. No. 10/948,751, entitled "METHOD FOR FINDING PATHS IN VIDEO," filed Sep. 24, 2004; the contents of both are incorporated herein in their entirety.

FIELD OF THE INVENTION

The present invention is related to video-based surveillance and monitoring. More specifically, specific embodiments of the invention relate to context-sensitive video-based surveillance and monitoring systems, with applications in market research and/or statistical/contextual target modeling.

BACKGROUND OF THE INVENTION

Many businesses and other facilities, such as banks, stores, airports, etc., make use of security systems. Among such systems are video-based systems, in which a sensing device, like a video camera, obtains and records images within its sensory field. For example, a video camera will provide a video record of whatever is within the field-of-view of its lens. Such video images may be monitored by a human operator and/or reviewed later by a human operator. Recent progress has allowed such video images to be monitored also by an automated system, improving detection rates and saving human labor.

In many situations it would be desirable to specify the detection of targets using relative modifiers such as fast, slow, tall, flat, wide, narrow, etc., without quantifying these adjectives. Likewise it would be desirable for state-of-the-art surveillance systems to adapt to the peculiarities of the scene, as current systems are unable to do so, even if the same systems have been monitoring the same scene for many years.

SUMMARY OF THE INVENTION

Embodiments of the present invention are directed to enabling the automatic extraction and use of contextual information. Furthermore, embodiments of the present invention may provide contextual information about moving targets. This contextual information may be used to enable context-sensitive event detection, and it may improve target detection, improve tracking and classification, and decrease the false alarm rate of video surveillance systems.

The embodiments of the invention may include a system that builds path models from analysis of a plurality of targets observed from a surveillance video sequence. The mature path models may be used to identify whether a target's behavior is consistent with respect to the expected target behavior, to predict a target's subsequent path based on the target's observed behavior and to classify a target's type. The embodiments of the invention may also include building a statistical model of targets' behavior with respect to their path models, which may be used to analyze a target's interaction with scene elements and with other targets.

A method of video processing may include automatic extraction and use of contextual information about moving targets in a surveillance video. The contextual information may be gathered in the form of statistical models representing the expected behavior of targets. These models may be used to detect context sensitive events when a target's behavior does not conform to the expected behavior. Furthermore, detection, tracking and classification of targets may also be improved using the contextual information.

In one embodiment, a system for detecting behavior of a target, may include: a target detection engine, adapted to detect at least one target from one or more objects from a video surveillance system recording a scene; a path builder, adapted to create at least one mature path model from analysis of the behavior of a plurality of targets in the scene, wherein the at least one mature path model includes a model of expected target behavior with respect to the at least one path model; a target behavior analyzer, adapted to analyze and identify target behavior with respect to the at least one mature path model; and an alert generator, adapted to generate an alert based on the identified behavior.

In another embodiment, a computer-based method of target behavior analysis may include the steps of: processing an input video sequence to obtain target information for at least one target from one or more objects from a video surveillance system recording a scene; building at least one mature path model from analysis of the behavior of a plurality of targets in the scene, wherein the at least one mature path model includes a model of expected target behavior with respect to the at least one path model; analyzing and identifying target behavior of a target with respect to the at least one mature path model; and generating an alert based on the identified target behavior.

In another embodiment, a computer-readable medium may contain instructions that, when executed by a processor, cause the processor to perform operations including: processing an input video sequence to obtain target information for at least one target from one or more objects from a video of a scene; building at least one mature path model from analysis of the behavior of a plurality of targets in the scene, wherein said at least one mature path model includes a model of expected target behavior with respect to said at least one path model; and analyzing and identifying target behavior of a target with respect to said at least one mature path model.

The invention may be embodied in the form of hardware, software, or firmware, or in the form of combinations thereof.

DEFINITIONS

The following definitions are applicable throughout this disclosure, including in the above.

A "video" may refer to motion pictures represented in analog and/or digital form. Examples of video include: television, movies, image sequences from a video camera or other observer, and computer-generated image sequences.

A "frame" may refer to a particular image or other discrete unit within a video.

An "object" may refer to an item of interest in a video. Examples of an object include: a person, a vehicle, an animal, and a physical subject.

A "target" may refer to a computer's model of an object. A target may be derived via image processing, and there is a one-to-one correspondence between targets and objects.

A "target instance," or "instance," may refer to a sighting of an object in a frame.

An "activity" may refer to one or more actions and/or one or more composites of actions of one or more objects. Examples of an activity include: entering; exiting; stopping; moving; raising; lowering; growing; and shrinking.

A "location" may refer to a space where an activity may occur. A location may be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" may refer to one or more objects engaged in an activity. The event may be referenced with respect to a location and/or a time.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a chip, chips, or a chip set; an optical computer; and an apparatus that may accept data, may process data in accordance with one or more stored software programs, may generate results, and typically may include input, output, storage, arithmetic, logic, and control units.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; and a memory chip.

"Software" may refer to prescribed rules to operate a computer. Examples of software may include: software; code segments; instructions; applets; pre-compiled code; compiled code; computer programs; and programmed logic.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

A "sensing device" may refer to any apparatus for obtaining visual information. Examples include: color and monochrome cameras, video cameras, closed-circuit television (CCTV) cameras, charge-coupled device (CCD) sensors, analog and digital cameras, PC cameras, web cameras, and infra-red imaging devices. If not more specifically described, a "camera" refers to any sensing device.

A "blob" may refer generally to any object in an image (usually, in the context of video). Examples of blobs include moving objects (e.g., people and vehicles) and stationary objects (e.g., bags, furniture and consumer goods on shelves in a store).

A "target property map" may refer to a mapping of target properties or functions of target properties to image locations. Target property maps are built by recording and modeling a target property or function of one or more target properties at each image location. For instance, a width model at image location (x,y) may be obtained by recording the widths of all targets that pass through the pixel at location (x,y). A model may be used to represent this record and to provide statistical information, which may include the average width of targets at location (x,y), the standard deviation from the average at this location, etc. Collections of such models, one for each image location, are called a target property map.

A "path" may refer to an image region, not necessarily connected, that represents the loci of targets: a) whose trajectories start near the start point of the path; b) whose trajectories end near the end point of the path; and c) whose trajectories overlap significantly with the path.

BRIEF DESCRIPTION OF THE DRAWINGS

Specific embodiments of the invention will now be described in further detail in conjunction with the attached drawings, in which.

DETAILED DESCRIPTION OF VARIOUS EMBODIMENTS OF THE INVENTION

Figure 1:
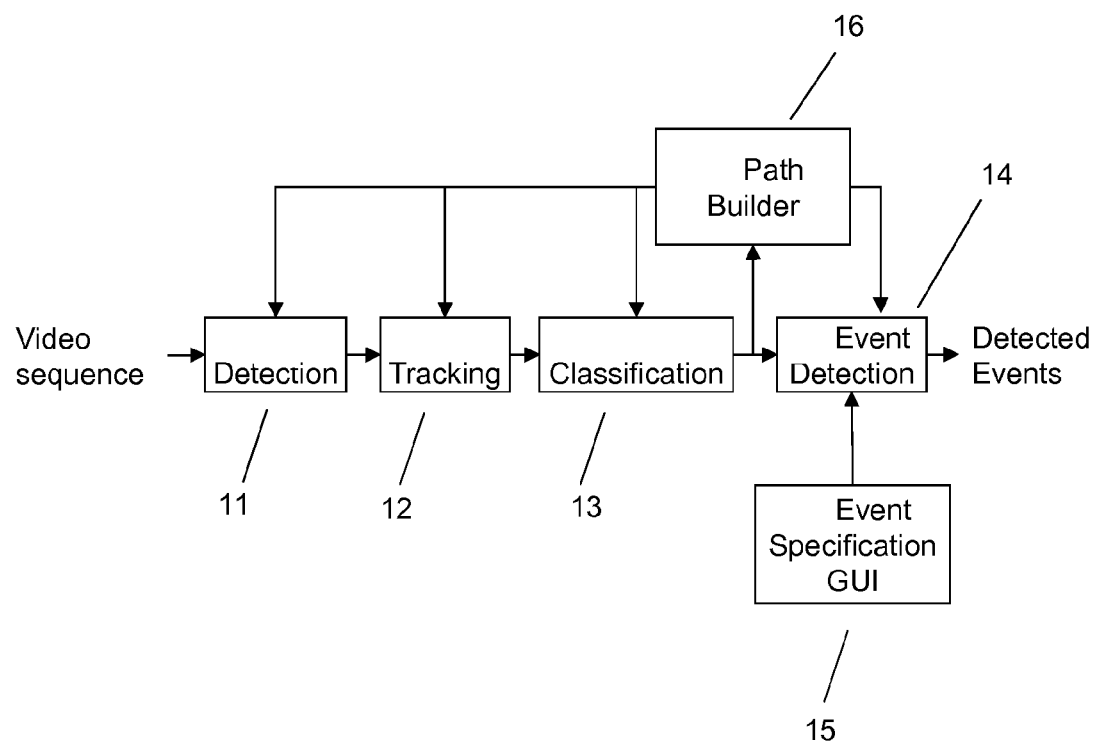
FIG. 1 depicts a flowchart of a content analysis system that may include embodiments of the invention.

Embodiments of the invention may comprise part of a general surveillance system. A potential embodiment is illustrated in FIG. 1. Target property information is extracted from the video sequence by detection (11), tracking (12) and classification (13) modules. These modules may utilize known or as yet to be developed techniques. The target property information may be extracted from live video or from previously recorded video. The resulting information is passed to an event detection module (14) that matches observed target properties against properties deemed threatening by a user. For example, the user may be able to specify such threatening properties by using a graphical user interface (GUI) (15) or other input/output (I/O) interface with the system. The path builder (16) monitors and models the data extracted by the up-stream components (11), (12), and (13), and it may further provide information to those components. Data models may be based on target properties, which may include, but which are not limited to, the target's location, width, height, size, speed, direction-of-motion, time of sighting, age, etc. This information may be further filtered, interpolated and/or extrapolated to achieve spatially and temporally smooth and continuous representations.

Figure 7:
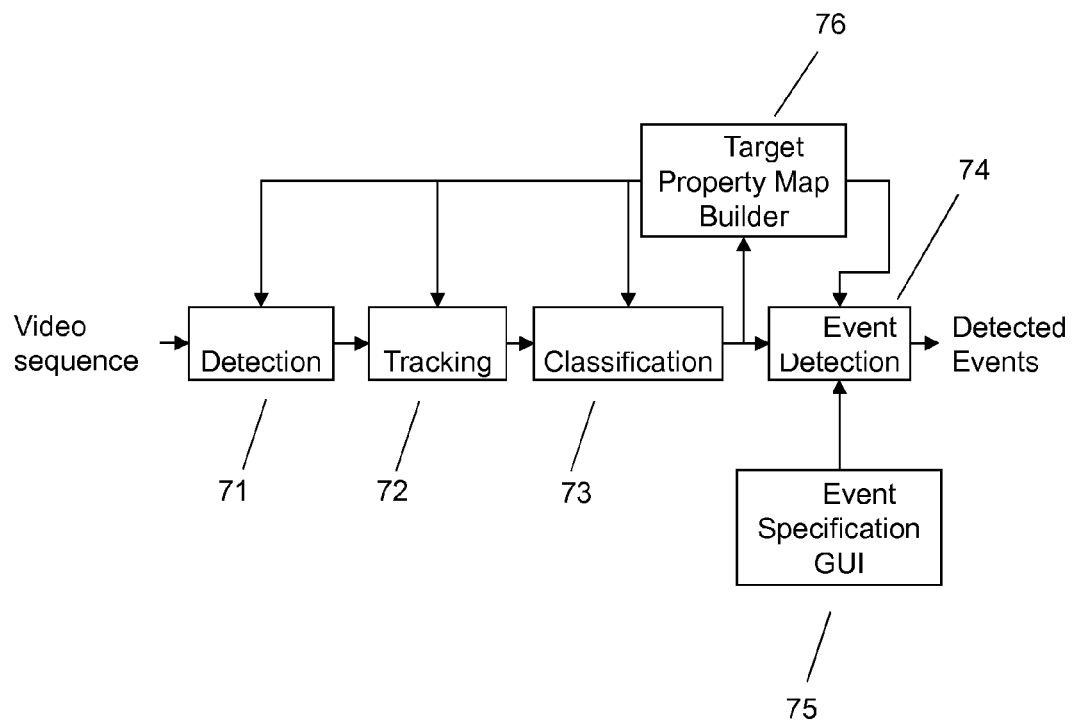
FIG. 7 depicts a second flowchart of a content analysis system that may include embodiments of the invention.

Another potential embodiment is illustrated in FIG. 7. Target property information is extracted from the video sequence by detection (71), tracking (72) and classification (73) modules. These modules may utilize known or as yet to be discovered techniques. The resulting information is passed to an event detection module (74) that matches observed target properties against properties deemed threatening by a user (75). For example, the user may be able to specify such threatening properties by using a graphical user interface (GUI) (75) or other input/output (I/O) interface with the system. The target property map builder (76) monitors and models the data extracted by the up-stream components (71), (72), and (73), and it may further provide information to those components. Data models may be based on a single target property or on functions of one or more target properties. Data models may be as simple as an average property value or a normal distribution model. Complex models may be produced based on algorithms tailored for a given set of target properties. For instance, a model may measure the ratio: (square root of a target's size)/(the target's distance to the camera).

Learning Paths by Observation

According to some embodiments of the invention, paths may need to be learned by observation before the paths can be used. To signal the validity of a path model, the path model is labeled "mature" only after a statistically meaningful amount of data has been observed. Queries to path models that have not yet matured are not answered. This strategy leaves the system in a default mode until at least some of the models have matured. When a path model has matured, it may provide information that may be incorporated into the decision making processes of connected algorithmic components. The availability of this additional information may help the algorithmic components to make better decisions.

The models that comprise target property maps may be built based on observation before they can be used; in an alternative embodiment, the target property models may be predetermined and provided to the system. The ensuing discussion will deal with the case in which the models are built as part of the process, but the other procedures are equally relevant to this alternative embodiment. For instance, the contextual information may be saved periodically to a permanent storage device, so that, following a system failure, much of the contextual information can be re-loaded from that permanent storage device. This embodiment provides the initial model information from an external—previously saved—source.

Not all targets or their instances are necessarily used for training. The upstream components (11), (12), and (13) that gather target properties may fail, and it is important that the models are shielded from data that is faulty. One technique for dealing with this problem is to devise algorithms that carefully analyze the quality of the target properties. In other embodiments of the invention, a simple algorithm may be used that rejects targets and target instances if there is a doubt about their quality. This latter approach likely extends the time until target property maps achieve maturity. However, the prolonged time that many video surveillance systems spend viewing a scene makes this option attractive in that the length of time to maturity is not likely to be problematic.

Figure 2:
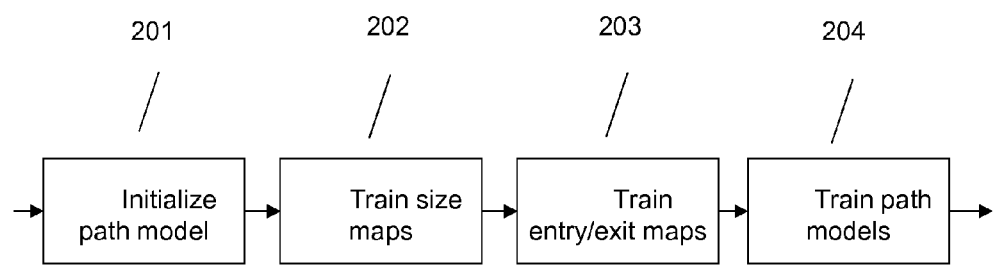
FIG. 2 depicts a flowchart describing training of paths, according to an embodiment of the invention.

An overview of an exemplary method for learning path models according to an embodiment of the invention is shown in FIG. 2. The major components may include initialization of the path model (201), training of size maps (202), training of entry/exit maps (203), and training of path models (204).

Size maps may be generated in Block 202 and may be used by the entry/exit map training algorithm (203) to associate trajectories with entry/exit regions. Entry/exit regions that are close compared to the normal size of the targets that pass through them are merged. Otherwise they are treated as separate entry/exit regions.

Entry/exit maps, which may be generated in Block 203, may in turn form the basis for path models. When entry/exit regions have matured they can be used to measure target movement statistics between them. These statistics may be used to form the basis for path models in Block 204.

The size and entry/exit maps are types of target property maps, and they may be trained (built) using a target property map training algorithm, which is described in co-pending, commonly-assigned U.S. Publication No. 2006-0072010A1 (U.S. patent application Ser. No. 10/948,785), filed on Sep. 24, 2004, entitled, "Target Property Maps for Surveillance Systems," and incorporated herein by reference. The target property map training algorithm may be used several times in the process shown in FIG. 2. To simplify the description of this process, the target property map training algorithm is explained here in detail and then referenced later in the algorithm detailing the extraction of path models.

Figure 3:
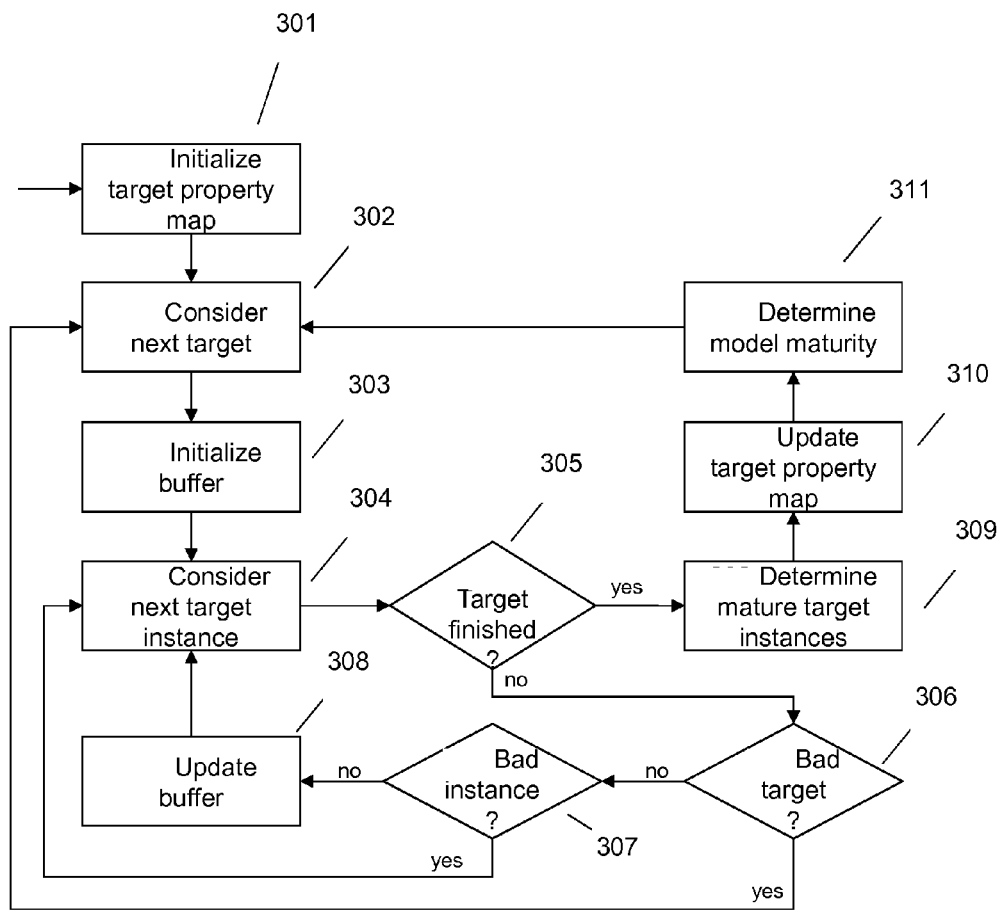
FIG. 3 depicts a flowchart describing the training of target property maps according to an embodiment of the invention.

FIG. 3 depicts a flowchart of an algorithm for building target property maps, according to an embodiment of the invention. Such an algorithm may be implemented, for example, in Target Property Map Builder (76), as shown in FIG. 7. The algorithm may begin by appropriately initializing an array corresponding to the size of the target property map (in general, this may correspond to an image size) in Block 301. In Block 302, a next target may be considered. This portion of the process may begin with initialization of a buffer, which may be a ring buffer, of filtered target instances, in Block 303. The procedure may then proceed to Block 304, where a next instance (which may be stored in the buffer) of the target under consideration may be addressed. In Block 305, it is determined whether the target is finished; this is the case if all of the target's instances have been considered. If the target is finished, the process may proceed to Block 309 (to be discussed below). Otherwise, the process may then proceed to Block 306, to determine if the target is bad; this is the case if this latest instance reveals a severe failure of the target's handling, labeling or identification by the up-stream processes. If this is the case, the process may loop back to Block 302, to consider the next target. Otherwise, the process may proceed with Block 307, to determine if the particular instance under consideration is a bad instance; this is the case if the latest instance reveals a limited inconsistency in the target's handling, labeling or identification by the up-stream process. If a bad instance was found, that instance is ignored and the process proceeds to Block 304, to consider the next target instance. Otherwise, the process may proceed with Block 308 and may update the buffer of filtered target instances, before returning to Block 304, to consider the next target instance.

Following Block 305 (as discussed above), the algorithm may proceed with Block 309, where it is determined which, if any, target instances may be considered to be "mature." According to an embodiment of the invention, if the buffer is found to be full, the oldest target instance in the buffer may be marked "mature." If all instances of the target have been considered (i.e., if the target is finished), then all target instances in the buffer may be marked "mature."

The process may then proceed to Block 310, where target property map models may be updated at the map locations corresponding to the mature target instances. Following this map updating, the process may determine, in Block 311, whether or not each model is mature. In particular, if the number of target instances for a given location is larger than a preset number of instances required for maturity, the map location may be marked "mature." As discussed above, only mature locations may be used in addressing inquiries.

Returning, now, to the process of FIG. 2, the target property map training algorithm of FIG. 3 will be referenced in describing the process of training path models. As discussed above, in Block 201, a path model may be initialized at the outset of the process. This may be done, for example, by initializing an array, which may be the size of an image (e.g., of a video frame).

The process of FIG. 2 may then proceed to Block 202, training of size maps. In an embodiment of the invention, the process of Block 202 uses the target property map training algorithm of FIG. 3 to train one or more size maps. The generic target property training algorithm of FIG. 3 may be changed to perform this particular type of training by modifying Blocks 301, 308, and 310. All three of these blocks, in Block 202 of FIG. 2, operate on size map instances of the generic target property map objects. Component 308 extracts size information from the target instance stream that enters the path builder (component 16 in FIG. 1). Separate size maps may be maintained for each target type and for several time ranges.

The process of FIG. 2 may then train entry/exit region maps (Block 203). Once again, the algorithm of FIG. 3 may be used to perform the map training. To do so, the instantiations of the initialization component (301), the extraction of target origin and destination information (308), and the target property model update component (310) may all be changed to suit this particular type of map training. Component 301 may operate on entry/exit map instances of the generic target property map objects. Component 308 may extract target scene entry and exit information from the target instance stream that enters the path builder (component 16 in FIG. 1). Component 309 may determine a set of entry and exit regions that represent a statistically significant number of trajectories. These regions are deemed to deserve representation and may be annotated with target statistics, such as, but not limited to, the region size and location, the percentage of targets in the scene that enter or exit through the region, etc. Component 310 may update the entry/exit region model to reflect changes to the shapes and/or target coverage of the entry/exit regions. This process may use information provided by a size map trained in Block 202 to decide whether adjacent entry or exit regions need to be merged. Entry regions that are close to each other may be merged into a single region if the targets that use them are large compared to the distance between them. Otherwise, they may remain separate regions. The same approach may be used for exit regions. This enables maintaining separate paths even when the targets on them appear to be close to each other at a great distance from the camera. The projective transformation that controls image formation is the cause for the apparent close proximity of distant objects. One may use the ratio of target size over entry/exit region distance, target size/distance between regions, for example, as it is practically invariant under perspective transformation and thus simplifies the region maintenance algorithm. Separate size maps may be maintained for each target type and for several time ranges.

Path models may then be trained, Block 204. According to an embodiment of the invention, this may begin with initialization of a path data structure. The process may then use the information contained in the entry and exit region map to build a table with a row for each entry region and a column for every exit region in the entry and exit region map. Each trajectory may be associated with an entry region from which it originates and an exit region where it terminates. The set of trajectories associated with an entry/exit region pair is used to define the locus of the path. According to various embodiments of the invention, a path may be determined by taking the intersection of all trajectories in the set, by taking the union of those trajectories, or by defining a path to correspond to some minimum percentage of trajectories in the set. The path data structure combines the information gathered about each path: the start and end points of the path, the number or fraction of trajectories it represents, and two indices into the entry/exit region map that indicate which entry and exit regions in that data structure it corresponds to. Separate path models may be maintained for each type of target and for several time ranges.

Three potential exemplary implementations of embodiments of the invention according to FIG. 3 may differ in the implementations of the algorithmic components labeled 301, 306, 307, and 308.

A first implementation may be useful in providing target property maps for directly available target properties, such as, but not limited to, width, height, size, direction of motion, and target entry/exit regions. This may be accomplished by modifying only Block 308, buffer updating, to handle the different instances of this implementation.

A second implementation may be useful in providing target property maps for functions of multiple target properties, such as speed (change in location/change in time), inertia (change in location/target size), aspect ratio (target width/target height), compactness (target perimeter/target area), and acceleration (rate of change in location/change in time). In this case, Blocks 301 (map initialization) and 308 may be modified to handle the different instances of this embodiment.

The third implementation may be useful in providing target property maps that model current target properties in the context of each target's own history. These maps can help to improve up-stream components, and may include, but are not limited to, detection failure maps, tracker failure maps, and classification-failure maps. Such an implementation may require changes to modules 301, 306 (target instance filtering), 307 (target filtering) and 308, to handle the different instances of this implementation.

Using Target Property Maps

Figure 8:
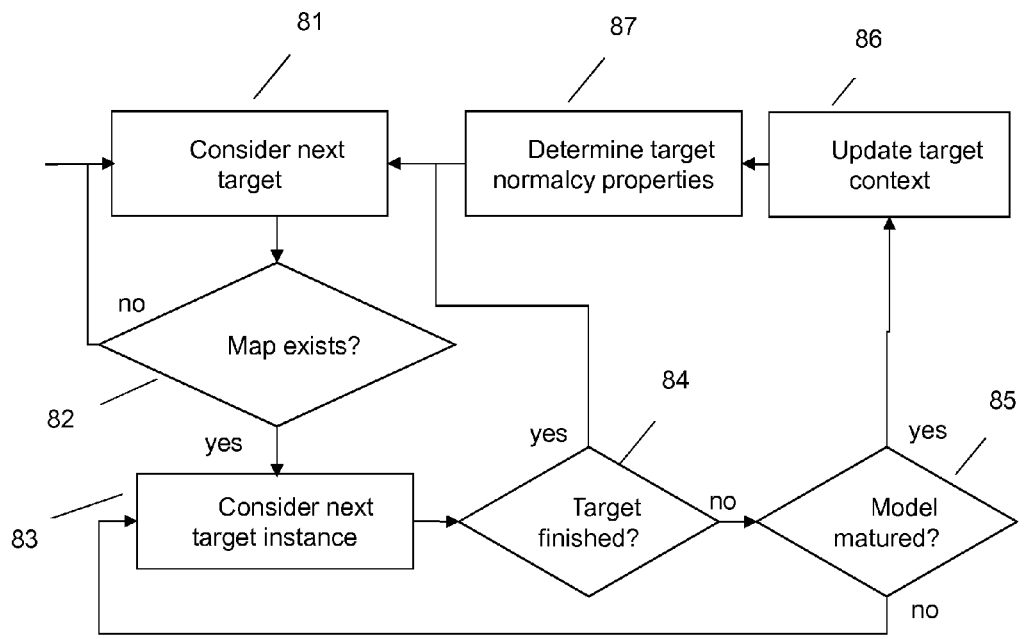
FIG. 8 depicts a flowchart describing the use of target property maps according to an embodiment of the invention.

The algorithm described above, in connection with FIG. 8, may be used to build and maintain target property maps. However, to make them useful to a surveillance system they should also be able to provide information to the system. FIG. 8 depicts a flowchart of an algorithm for querying target property maps to obtain contextual information, according to an embodiment of the invention.

The algorithm of FIG. 8 may begin by considering a next target, in Block 81. It may then proceed to Block 82, to determine if the requested target property map has been defined. If not, the information about the target is unavailable, and the process may loop back to Block 81, to consider a next target.

If the requested target property map is determined to be available, the process may then consider a next target instance, in Block 83. If the instance indicates that the target is finished, in Block 84, the process may loop back to Block 81 to consider a next target; this is the case if all of the current target's instances have been considered. If the target is not finished, the process may proceed to Block 85 and may determine if the target property map model at the location of the target instance under consideration has matured. If it has not matured, the process may loop back to Block 83 to consider a next target instance. Otherwise, the process may proceed to Block 86, where the target context may be updated. The context of a target is updated by recording the degree of its conformance with the target property map maintained by this algorithm. Following Block 86, the process may proceed to Block 87 to determine normalcy properties of the target based on its target property context. The context of each target is maintained to determine whether it acted in a manner that is inconsistent with the behavior or observations predicted by the target property map model. Finally, following Block 87, the procedure may return to Block 81 to consider a next target.

Using Path Models

Path models may be obtained and maintained using information from an existing surveillance system. However, to make path models useful, the path models must also be able to provide information to the system. Path models may allow prediction of a target's destination, given the target's location and its observed trajectory. For example, a target path in a path model for a hardware store may describe that targets leaving the power-tools department tend to stop at the department check-out. In another example, a target path in a path model may describe that targets traveling the path tend to reach the other end of the path within a specific time frame, e.g., two minutes.

Path models may also allow classification of a target's path or of the target, based on the path type. For example, targets that are vehicles, pedestrians, trains or airplanes tend to travel, respectively, on roads, sidewalks, railroad tracks or runways.

Figure 6:
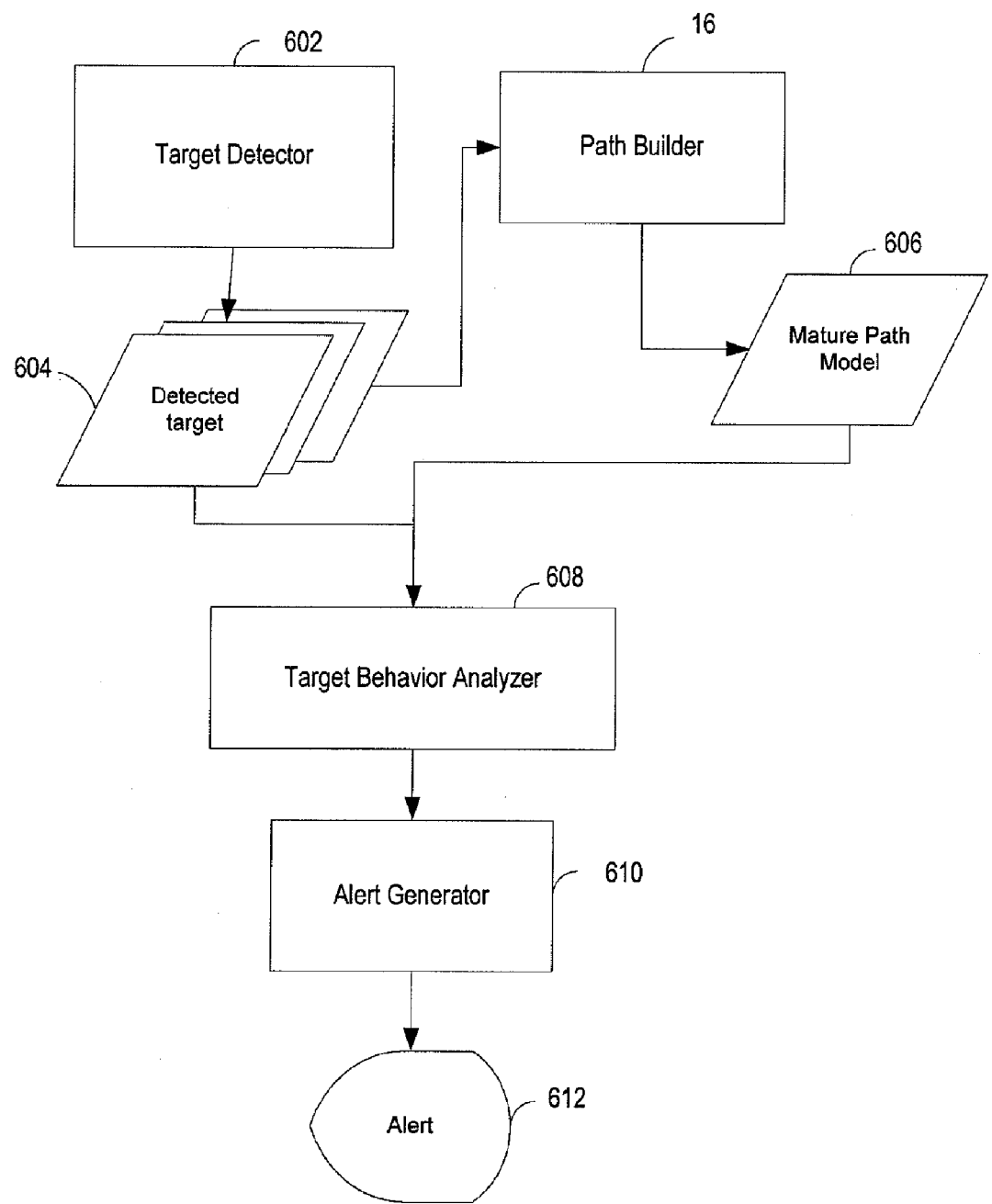
FIG. 6 depicts a block diagram of a system according to embodiments of the present invention.

FIG. 6 depicts a block diagram of a system for creating and using path models, according to embodiments of the present invention. The system may include a target detection engine 602. Target detection engine 602 may detect one or more targets 604 from one or more objects from a video surveillance system recording a scene (not shown). Targets 604 may be provided to path builder 16 for the creation of a mature path model 606, as described above. Mature path model 606 may include a model of expected target behavior with respect to the mature path model. A target behavior analyzer 608 may analyze and identify behavior of later detected targets 604 with respect to the mature path model 606. An alert generator 610 may receive the results of the analysis and may generate an alert 612 when a specified behavior is detected and identified. Examples of the use of the system are illustrated below.

Using Path Models in Market Research and/or Statistical/Contextual Target Modeling Path models may also allow analysis of target properties. In an exemplary embodiment, market research and/or statistical/contextual target modeling may benefit from the following information determined from path models.

Information about target dwell times and locations along learned paths may help to determine, e.g., where shoppers spend their time while on-site, on which aisle and/or in front of which products, which products customers compare, and which products they select with or without comparison to other products.

Information about relative dwell locations along learned paths may help to determine, e.g., whether customers that were interested in product A also look at product B and with what probability C and dwell time D.

Information about target properties associated with paths, dwell locations and times may help to associate, for example, a target type with a target size, or a target's clothing or uniform.

Information about interactions of targets on paths with other targets of the same or different type may help detection, for example, of when vehicles stop next to each other while traveling to and from a sensitive site.

Information about interactions of targets on a path with scene elements, such as, e.g., buildings, roads, sidewalks, grass/lawn regions, and/or water regions, may help to determine, for example, how many (distinct) customers make use of an aisle-barcode reader, or how many vehicles actually stop at a four-way-stop intersection.

Information about temporal patterns of target properties on a path, such as weekday vs. weekend, morning vs. noon vs. evening vs. nighttime, summer vs. winter, may help with determining normal building access patterns after-hours for security applications.

Information about deviations from normal target properties along a path due to time of day/week/year, location, target type, and/or traffic density, for instance, normal access pattern information, may help to determine suspicious building access.

In addition, the information described above may be combined in many ways to provide further benefit to market research and/or statistical/contextual target modeling.

Statistical Modeling for Public Safety and Planning

Gathering statistical data of target behavior on a path may provide a range of target properties on the path, for example, normal speed, size, width, and/or height of moving objects. In one application, law enforcement may use this information to determine the normal speed, size, width, and/or height of objects moving on e.g., footpaths, parking lots, roads, water channels, canals, lakes, ports, and/or airport taxiways/runways. The statistical information can be used further to determine deviations from normal object properties in subsequently observed targets.

Gathering statistical data of target behavior on a path may provide a range of, for example, normal driving regions, directions, object entry and exit probabilities. In one application, for example, traffic planning, reconnaissance or surveillance applications may use this information to determine traffic statistics that can highlight, e.g., choke points, popular access points, underutilized access points, and/or traffic patterns.

Gathering statistical data of target behavior on a path may provide higher order statistics of objects. For instance, traffic planners may use this information to determine the expected deviation from normal object behavior. This information can be used further to determine deviations from the expected deviation from normal object behavior.

Analysis and Detection of Unusual Target Behavior on a Path

Path models may also allow detection of unusual target properties and/or behavior, such as, for example, when a target deviates from its path. For instance, information about a target's deviation from a path may help to detect targets that travel in parts of the scene not associated with any known path, or to detect targets that enter the scene outside known entry points/regions and/or known exit points/regions. In another example, a target leaving a path at a point other than the exit point/region expected for targets on the path may be detected. This information may help to detect, for example, vehicles that fail to travel between designated checkpoints.

Deviation from a path may also be determined by detection of a failure to arrive on time or at the desired location. For instance, security and surveillance applications may use this information to determine whether a person or vehicle passes swiftly and directly between checkpoints. In production process monitoring, this information may be used to determine whether a manufacturing process is functioning as intended.

In another example, a target joining a path at a point other than the entry point/region expected for targets on the path may be detected. This information may help to detect, for example, customers leaving the premises of a shop without passing a checkout or service desk.

Information about a target switching paths may help to detect, for example, targets that travel first on an employee or customer or visitor path, and then switch to a path associated with security guards.

Information about a target crossing a path may help to detect, for example, vehicles in a parking lot (each starting from mutually disjoint world locations), that are expected to merge into the exit lanes, rather than crossing them.

Information about a target traveling on an infrequently used path may help to detect, for example, access to a dangerous area at a refinery.

Information about a target traveling unusually slowly, unusually fast or stopping where targets do not usually stop may help to detect, for example, vehicles that stop between border checkpoints of neighboring countries. In traffic monitoring applications, this information may help to detect vehicles traveling above the speed limit.

Information about a target traveling on a path, but at an unusual time, may help to detect, for example, unauthorized access to a closed facility at nighttime, even if the same facility is accessible by day. This information may also allow the comparison of current target behavior with access patterns normal for a particular time of day to detect potential trespassers.

Information about a target traveling on a path, but in unusual direction, may help to detect, for example, "ghost drivers" traveling in the wrong direction along a highway. In another example, this information may be used to determine that the heading of a target heading is going to bring the target too close to a sensitive site.

Information about a target traveling on a path that is not normally associated with targets of the target's type may help to detect, for example, vehicles on a sidewalk or an urban pedestrian area.

Information about properties of the target on a certain path that are unusual may help to detect targets whose width, height, size, area, target perimeter length, color (hue, saturation, luminance), texture, compactness, shape and/or time of appearance is unexpected.

In addition, the information described above may be combined in many ways to provide further benefit to detection of dangerous, unauthorized, suspicious, or otherwise noteworthy behavior.

Information about two or more events may be combined to detect unusual co-occurrences. One or more detected unusual target behaviors may be combined, or with target behaviors detected in the context of a statistical model to detect unusual co-occurrences. For instance, surveillance applications may use information of a detected site access with detection of an un-manned guard post to detect an unauthorized access.

Figure 4:
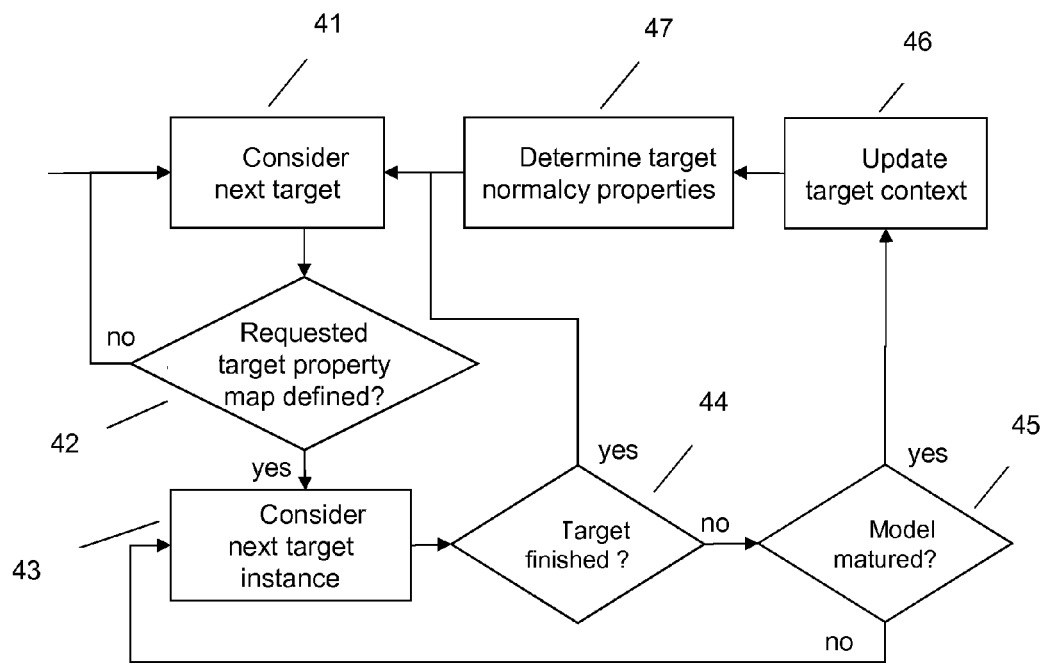
FIG. 4 depicts a flowchart describing the use of target property maps according to an embodiment of the invention.

FIG. 4 depicts a flowchart of an algorithm for querying path models (e.g., by one or more components of a surveillance system) to obtain contextual information, according to an embodiment of the invention.

The algorithm of FIG. 4 may begin by considering a next target, in Block 41. It may then proceed to Block 42, to determine if the requested path model has been defined. If not, the information about the target is unavailable, and the process may loop back to Block 41, to consider a next target.

If the requested path model is determined to be available, the process may then consider a next target instance, in Block 43. If the instance indicates that the target is finished, in Block 44, the process may loop back to Block 41 to consider a next target. A target is considered finished if all of its instances have been considered. If the target is not finished, the process may proceed to Block 45 and may determine if the target property map model at the location of the target instance under consideration has matured. If it has not matured, the process may loop back to Block 43 to consider a next target instance. Otherwise, the process may proceed to Block 46, where target context may be updated. The context of a target may be updated by recording the degree of its conformance with the target property map maintained by this algorithm. Following Block 46, the process may proceed to Block 47 to determine normalcy properties of the target based on its target context. The context of each target is maintained to determine whether it acted in a manner that is inconsistent with the behavior or observations predicted by the target property map model. Finally, following Block 47, the procedure may return to Block 41 to consider a next target.

Figure 5:
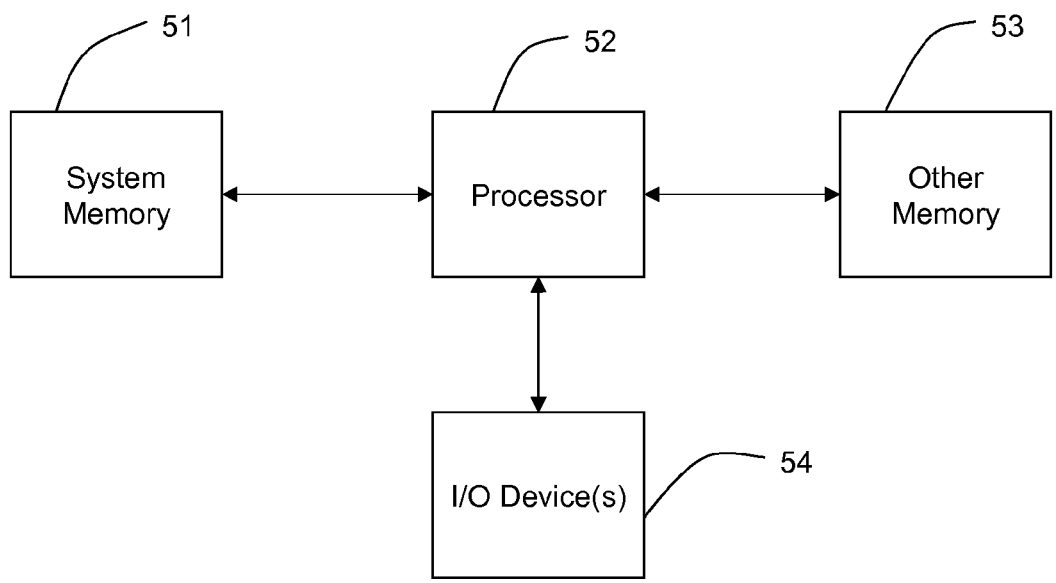
FIG. 5 depicts a block diagram of a system that may be used in implementing some embodiments of the invention.

Some embodiments of the invention, as discussed above, may be embodied in the form of software instructions on a machine-readable medium. Such an embodiment is illustrated in FIG. 5. The computer system of FIG. 5 may include at least one processor 52, with associated system memory 51, which may store, for example, operating system software and the like. The system may further include additional memory 53, which may, for example, include software instructions to perform various applications. The system may also include one or more input/output (I/O) devices 54, for example (but not limited to), keyboard, mouse, trackball, printer, display, network connection, etc. The present invention may be embodied as software instructions that may be stored in system memory 51 or in additional memory 53. Such software instructions may also be stored in removable or remote media (for example, but not limited to, compact disks, floppy disks, etc.), which may be read through an I/O device 54 (for example, but not limited to, a floppy disk drive). Furthermore, the software instructions may also be transmitted to the computer system via an I/O device 54 for example, a network connection; in such a case, a signal containing the software instructions may be considered to be a machine-readable medium.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A video processing system comprising:
   an up-stream video processing device to accept an input video sequence and to output target information derived from at least one target in said input video sequence, wherein said target information comprises at least one target property or at least one function of said at least one target property;
   a target property map builder, coupled to said up-stream video processing device to receive at least a portion of said target information and to build at least one target property map for at least one target type, wherein said target property map comprises a statistical model based on a record of said at least one target property from instances of at least one target type or said at least one function of said at least one target property from instances of said at least one target type in said input video sequence, wherein the statistical model corresponding to an image location, target property or function of target properties and target type is a record of said property of instances of targets of said type that pass through said location, and wherein the statistical model represents at least one of a normal behavior or a normal property of instances of targets of said type that pass through said location; and the target property map builder being further configured to, for a given target:
consider at least one instance of the target;
determine if said at least one instance of the target is a bad instance, and
if said at least one instance of the target is a bad instance, filter said at least one instance of the target by ignoring said at least one instance of the target.

2. The system according to claim 1, wherein said up-stream video processing device comprises:
a detection device to receive said input video sequence;
a tracking device coupled to said detection device; and
a classification device coupled to said tracking device, an output of said classification device being provided to said target property map builder.

3. The system according to claim 1, further comprising:
an event detection device coupled to receive an output of said target property map builder and to output one or more detected events that do not conform to the at least one of the normal behavior or the normal property based on the statistical model.

4. The system according to claim 3, further comprising:
an event specification interface coupled to said event detection device to provide one or more events of interest to said event detection device.

5. The system according to claim 4, wherein said event specification interface comprises a graphical user interface.

6. The system according to claim 1, wherein said target property map builder provides feedback to said up-stream video processing device.

7. The system according to claim 1, wherein said target property map builder comprises: at least one buffer.

8. The system according to claim 1, wherein said at least one location comprises at least one scene-based location.

9. The system according to claim 1, wherein said at least one location comprises at least one image-based location.

10. The system according to claim 1, wherein said video processing system is replaced with a sensor processing system.

11. A method of video processing, comprising:
processing an input video sequence to obtain target information derived from at least one target in said input video sequence, wherein said target information comprises at least one target property or at least one function of said at least one target property;
building at least one target property map that comprises a statistical model based on a record of said at least one target property or said at least one function of said at least one target property from said at least one target in said input video sequence, wherein the statistical model corresponding to an image location, target property or function of target properties and target type is a record of said property of instances of targets of said type that pass through said location, and wherein the statistical model represents at least one of a normal behavior or a normal property of instances of targets of said type that pass through said location; and wherein said building at least one target property map further includes,
considering at least one instance of the target;
determining if said at least one instance of the target is a bad instance, and
if said at least one instance of the target is a bad instance, filtering said at least one instance of the target by ignoring said at least one instance of the target.

12. The method according to claim 11, wherein said processing an input video sequence comprises:
detecting at least one target;
tracking at least one target; and
classifying at least one target.

13. The method according to claim 11, wherein said building at least one target property map further comprises:
if at least one instance of the target is mature, updating at least one map model corresponding to at least one location where an instance of the target is mature.

14. The method according to claim 13, wherein said building at least one target property map further comprises:
determining if at least one model forming part of said at least one target property map is mature.

15. The method according to claim 11, further comprising:
detecting at least one event based on said at least one target property map.

16. The method according to claim 15, wherein said detecting at least one event comprises:
for a given target, comparing at least one corresponding property model of the target with at least one property of said at least one target property map, at the corresponding location.

17. The method according to claim 16, wherein said comparing comprises:
using a user-defined comparison criterion.

18. The method according to claim 15, further comprising:
obtaining at least one user-defined criterion for event detection.

19. A non-transitory computer-readable medium containing instructions that, when executed by a processor, cause the processor to:
process an input video sequence to obtain target information derived from at least one target in said input video sequence, wherein said target information comprises at least one target property or at least one function of said at least one target property; and
build at least one target property map that comprises a statistical model based on a record of said at least one target property or said at least one function of said at least one target property from said at least one target in said input video sequence, wherein the statistical model corresponding to an image location, target property or function of target properties and target type is a record of said property of instances of targets of said type that pass through said location, and wherein the statistical model represents at least one of a normal behavior or a normal property of instances of targets of said type that pass through said location; and wherein said building at least one target property map further includes,
considering at least one instance of the target;
determining if said at least one instance of the target is a bad instance, and if said at least one instance of the target is a bad instance, filtering said at least one instance of the target by ignoring said at least one instance of the target.

20. A video processing system comprising:
a computer system; and
the computer-readable medium according to claim 19.

21. A video surveillance system comprising:
at least one camera to generate an input video sequence; and
the video processing system according to claim 20.

22. The method according to claim 11, wherein said at least one location comprises at least one scene-based location.

23. The method according to claim 11, wherein said at least one location comprises at least one image-based location.

* * * * *